(12) United States Patent
Reed et al.

(10) Patent No.: US 9,938,693 B1
(45) Date of Patent: Apr. 10, 2018

(54) ASSET TRACKING AND WORK TOOL IDENTIFICATION

(71) Applicant: Caterpillar Inc., Peoria, IL (US)

(72) Inventors: Joshua D. Reed, Galesburg, IL (US); Bradley F. Bergerhouse, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/380,794

(22) Filed: Dec. 15, 2016

(51) Int. Cl.
| | | |
|---|---|---|
| *E02F 9/26* | (2006.01) | |
| *G06K 7/10* | (2006.01) | |
| *H04B 1/3827* | (2015.01) | |
| *E02F 5/14* | (2006.01) | |
| *E02F 3/32* | (2006.01) | |

(52) U.S. Cl.
CPC ............ *E02F 9/264* (2013.01); *E02F 3/32* (2013.01); *E02F 5/145* (2013.01); *G06K 7/10386* (2013.01); *H04B 1/3833* (2013.01); *G06K 2007/10524* (2013.01)

(58) Field of Classification Search
CPC .. E02F 9/264; E02F 3/32; E02F 5/145; G06K 7/10386; G06K 2007/10524; H04B 1/3833
See application file for complete search history.

(56) References Cited

U.S. PATENT DOCUMENTS

| | | |
|---|---|---|
| 6,542,789 B2 | 4/2003 | Ufheil |
| 7,890,235 B2 | 2/2011 | Self et al. |
| 8,401,744 B2 | 3/2013 | Chiocco |
| 8,502,674 B1 | 8/2013 | Cole |
| 8,521,371 B2 | 8/2013 | Faivre |
| 9,299,019 B2 | 3/2016 | Rasmussen |
| 2008/0088454 A1* | 4/2008 | Flores ................ G08B 13/2457 340/572.4 |
| 2009/0036104 A1 | 2/2009 | Malik |
| 2009/0303009 A1* | 12/2009 | Itasaki .................... H04Q 9/00 340/10.1 |
| 2010/0058901 A1* | 3/2010 | Calloway ............... B25B 23/14 81/479 |
| 2013/0109375 A1* | 5/2013 | Zeiler ................... H04W 4/028 455/426.1 |

(Continued)

FOREIGN PATENT DOCUMENTS

WO        2016115499        7/2016

*Primary Examiner* — James Yang

(74) *Attorney, Agent, or Firm* — James S. Bennin; Miller, Matthias & Hull

(57) ABSTRACT

A tracking system for a work tool is disclosed. The tracking system may include a tracking device coupled to the work tool and configured to transmit a work tool identification signal and a scanning device configured to scan and detect the work tool identification signal within the area around the scanning device and the tracking device. A location identification module and a communication module may be coupled to the scanning device and configured to receive the work tool identification signal, generate a work tool location signal including a location indicator and an identification of the work tool, add a date and time stamp to the work tool location signal and transmit the work tool location signal to an asset location center. The tracking system may further include a controller configured to receive and save the work tool location signal with the date and time stamp into an asset location database.

19 Claims, 4 Drawing Sheets

(56) References Cited

U.S. PATENT DOCUMENTS

2014/0055243 A1* 2/2014 Kerai ................ G06Q 10/0833
                                                      340/10.1
2015/0300165 A1    10/2015 Marsolek
2016/0116906 A1     4/2016 Grivetti
2016/0247218 A1*   8/2016 Stanasolovich .... G06Q 30/0201

* cited by examiner

ASSET TRACKING AND WORK TOOL IDENTIFICATION

FIELD OF THE DISCLOSURE

The present disclosure relates generally to a tracking system and, more particularly, relates to a tracking system for monitoring and identifying work tools.

BACKGROUND OF THE DISCLOSURE

Work machines, such as backhoes, skid steers, dozers, front-end loaders, excavators, track type machines, on-road trucks, off-road trucks, motor graders, industrial mining equipment, and the like may be used in mining, construction, agriculture, petroleum, and other such applications. During operation, one or more work tools may be operably coupled to the work machine in order to complete a specific task or operation. Furthermore, the work tool may be interchangeably configured such that when one task is completed the current work tool may be detached and another work tool may be attached to the work machine to carry out a subsequent task. As a result, the work machine may use a variety of different work tools when performing different tasks or operations around a job site.

Typically, when a work tool is not operably coupled or otherwise attached to the work machine the work tool may be left where it was last used. Furthermore, while the work tool may remain stationary when not in use, the work machine may continue to move about the job site, often times travelling from one end of the job site to the other. Additionally, it may become increasingly difficult to keep track of where a work tool is located at a job site that has more than one work machine and a variety of different work tools. Furthermore, when changing between work tools, different work tools may require the operator of the work machine to reconfigure or readjust operational parameters of the work machine such as hydraulic pressure and speed. This may increase the amount of time it takes for an operator to locate the work tool that is needed and/or may increase the amount of time it takes to complete the task or operation. As a result, it may be desirable to track the specific location of where a work tool may be located around the job site. Moreover, the time to change from one work tool to another may be reduced by uniquely identifying the work tool such that the operator may identify the specific work tool before attaching it to the work machine.

A method and system for monitoring a location of an object is disclosed in U.S. Pat. No. 8,502,674 entitled, "Monitoring the Location of an Object Using a Mobile Device," (the '674 patent). The monitoring method disclosed therein includes use of a mobile device which emits a radio frequency ("RF") signal to create a broadcast area. The RF signal then activates a plurality of radio frequency identifier tags ("RFID tags") that are located within the broadcast area. Once activated, the RFID tags of the '674 patent send a separate RF signal back to the mobile device. The RF signal sent from the RFID tag contains the tag's unique identifier which is then stored on the mobile device. An object with an RFID tag may be tracked only if the location of RFID tag falls within the broadcast area of the mobile device.

While arguably effective for its intended purpose, the prior art continues to need improvement in tracking and locating work tools on a job site.

SUMMARY OF THE DISCLOSURE

In accordance with one embodiment, a tracking system for a work tool is disclosed. The tracking system may include a tracking device coupled to the work tool and configured to transmit a work tool identification signal. Moreover, the tracking system may include a scanning device configured to scan for and detect the work tool identification signal within a work area. A location identification module may be coupled to the scanning device and configured to receive the work tool identification signal and generate a work tool location signal including a location indicator and a unique work tool identifier. Additionally, a communication module may be coupled to the scanning device and configured to add a date and time stamp to the work tool location signal and transmit the work tool location signal to an asset location center. The tracking system may further include a controller located in the asset location control center configured to receive the work tool location signal with the date and time stamp and the controller may be programmed to save the work tool location signal with the date and time stamp into an asset location database such that the asset location database displays a last known location of the work tool.

In accordance with another embodiment, a method of tracking a location of a work tool is disclosed. The method may include coupling a tracking device to the work tool and configuring the tracking device to transmit a work tool identification signal. The method may further include scanning for the work tool identification signal using a scanning device configured to detect the work tool identification signal within a work area. Additionally, the method may include programming a work tool location signal based on a location of the scanning device when the work tool identification signal is received and including a date and time stamp with the work tool location signal. The method may further include transmitting the work tool location signal to a controller located in an asset location control center. Moreover, the method may include receiving the work tool location signal, saving the work tool location signal with the date and time stamp to an asset location database, and displaying a last known location of the work tool in the asset location database.

In accordance with yet another embodiment, a work machine including a tracking system for a work tool is disclosed. The work machine may include a frame configured to support a power source of the work machine and the work tool may be operably coupled to the frame. The work machine may further include a tracking device coupled to the work tool and configured to transmit a work tool identification signal. Additionally, a scanning device may be attached to the work machine and configured to scan for the work tool identification signal within a work area. The work machine may further include a machine control module communicably coupled to the scanning device and configured to receive the work tool identification signal. The machine control module may include a location identification module communicably coupled to the machine control module to generate a work tool location signal based on a detection location of the work tool identification signal. Moreover, the machine control module may include a communication module communicably coupled to the machine control module to add a date and time stamp to the work tool location signal and transmit the work tool location signal to an asset location center.

These and other aspects and features of the present disclosure will be more readily understood upon reading the following detailed description in conjunction with the accompanying drawings.

DETAILED DESCRIPTION

Figure 1:
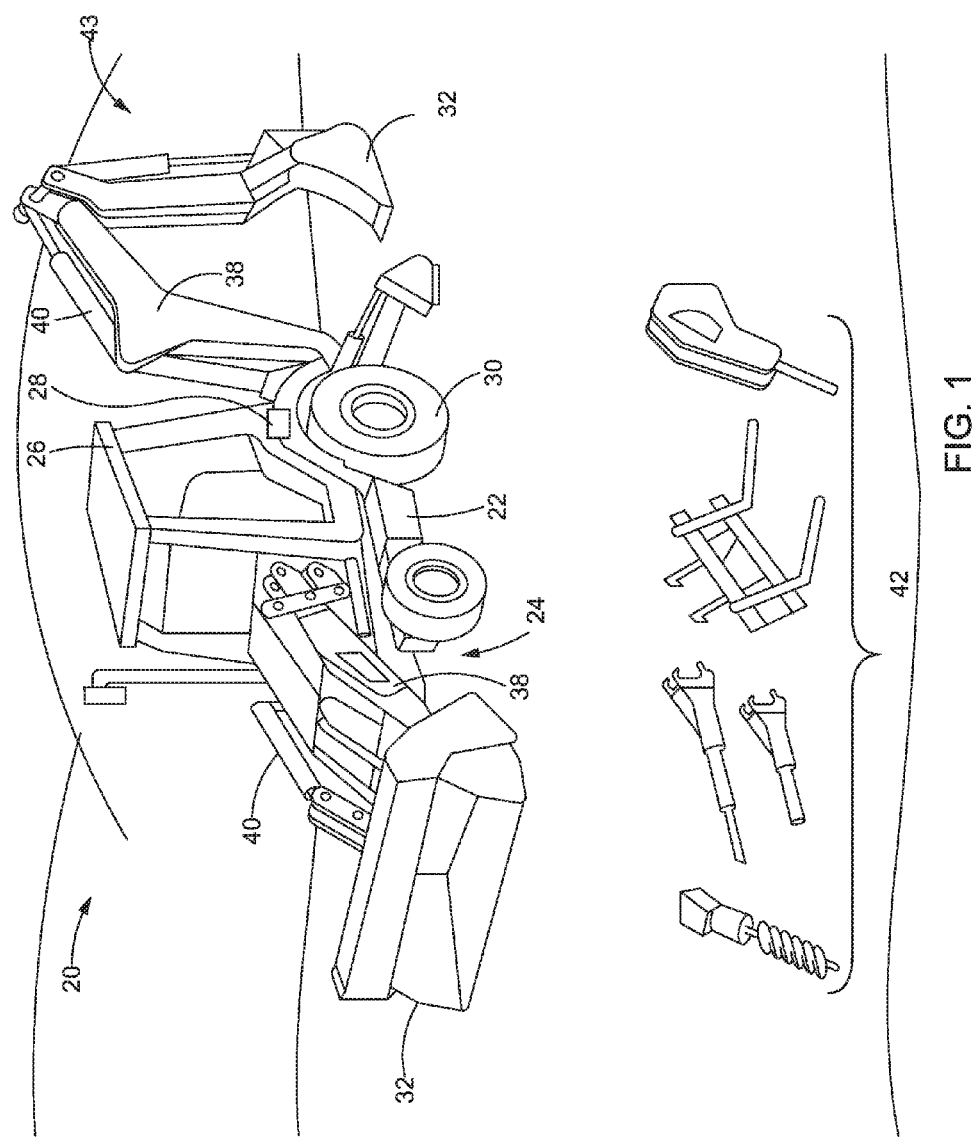
FIG. 1 is a perspective side view of a work machine and work tools at a job site, in accordance with an embodiment of the present disclosure.

Referring now to the drawings and with specific reference to FIG. 1, a work machine 20 is shown, in accordance with certain embodiments of the present disclosure. While one non-limiting example of the work machine 20 is illustrated as a loader/backhoe, it will be understood that the work machine 20 may include other types of machines such as but not limited to, a skid steer, a dozer, a front-end loader, an excavator, a track-type machine, an on-road truck, an off-road truck, a motor grader, industrial mining equipment, and any other such machine. The work machine 20 may include a frame 22 configured to support a power source 24, and an operator compartment or operator cabin 26. In some embodiments, the power source 24 may be a power generating source such as but not limited to, a diesel combustion engine, a gasoline combustion engine, an electric motor, and any other known power generating source or combination thereof. Moreover, the operator compartment 26 may include a machine control module 28 configured to monitor and execute various operational commands and other such functions of the work machine 20. In some embodiments, the machine control module 28 may be communicably coupled to operational controls such as but not limited to, a steering input device (not shown), a throttle control (not shown), a machine implement control (not shown), and other such operational controls. Furthermore, the machine control module 28 may be communicably coupled to a display device (not shown) which displays or otherwise outputs instructions or other operational commands to the operator of the work machine 20. As a result, the machine control module 28 may receive and transmit input signals, output signals and other such data communicated between the various operational controls (not shown) of the work machine 20.

The work machine 20 may further include a set of ground engaging elements 30 rotatably coupled to the frame 22. The ground engaging elements 30 may be driven by the power source 24 to propel the work machine 20 in a direction of travel. Moreover, the ground engaging elements 30 may be operably coupled to the steering input device (not shown), the throttle control (not shown), and other such operational controls configured to steer and maneuver the work machine 20. Additionally, the work machine 20 may include at least one work tool 32 operably attached to the frame 22 or other portion of the work machine 20. In one non-limiting example, two separate work tools 32 are attached to the work machine 20. For example, a first work tool 32, such as a bucket, may be attached at a front portion 34 of the work machine 20 and a second work tool 32, such as a backhoe, is attached at a rear portion 36 of the work machine 20. However, it will be understood that alternate numbers and types or work tools 32 may be attached to the work machine 20. Each work tool 32 may be coupled to the frame 22 with one or more attachment arms 38 and one or more actuation cylinders 40. Furthermore, the attachment arms 38 and actuation cylinders 40 may be configured to raise, lower, dig, dump, or perform another such action of the work tool 32. In some embodiments, the work machine 20 may be configured to interchangeably couple or otherwise attach to an assortment of additional work tools 42, such as but not limited to, a drill, a saw, a forklift, a hammer, an auger, a grapple, or other such tool. Typically, the additional work tools 42 may be stored or located around a work site or job site 43, such as but not limited to, a construction site, a warehouse, a rental yard or other such work site or job site 43 where the work tools 32, 42 may be located. In some embodiments, the assortment of work tools 42 may be scattered around the job site 43 and an operator of the work machine 20 may need to locate and attach the desired work tool 32, 42. It is to be understood that the work machine 20 is shown primarily for illustrative purposes to assist in disclosing features of various embodiments of the present disclosure, and that FIG. 1 may not depict all of the components of the work machine 20.

Figure 2:
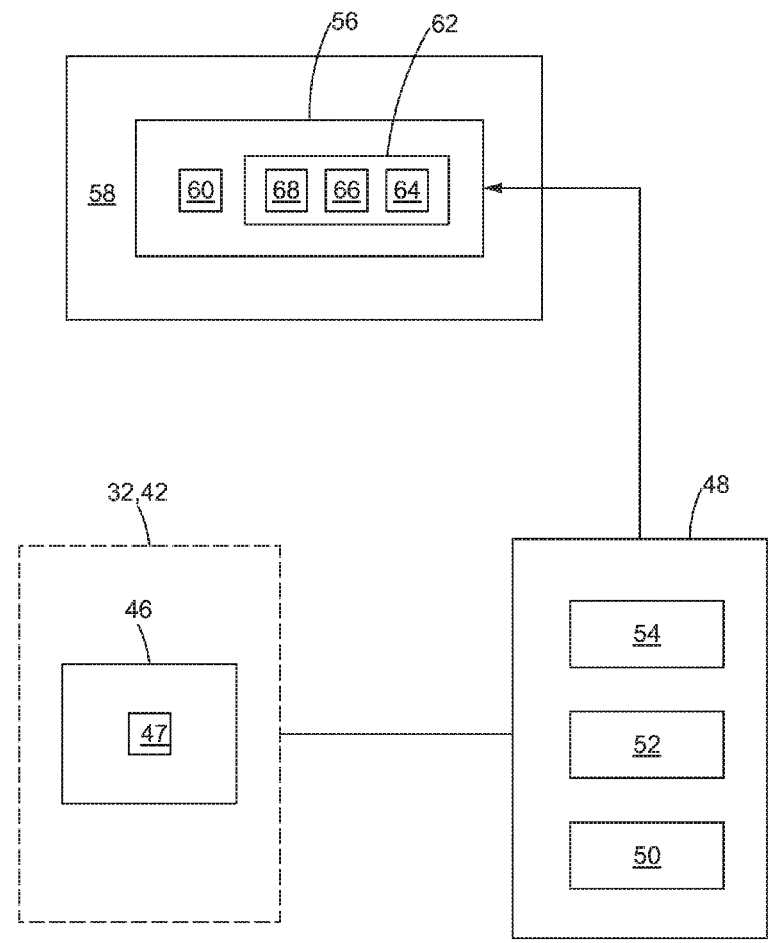
FIG. 2 is a schematic diagram of a tracking system for tracking and monitoring the work tools of FIG. 1, in accordance an embodiment of the present disclosure.

Referring now to FIG. 2, with continued reference to FIG. 1, a schematic of a work tool asset tracking system 44 for the work tools 32, 42 is illustrated. In one non-limiting example, a tracking device 46 is attached or otherwise mounted onto the work tool 32, 42 and the tracking device 46 may be configured to transmit or otherwise broadcast a work tool identification signal. In some embodiments, the work tool identification signal may include a unique identifier such as but not limited to, a media access control (MAC) address or other such unique identifier that may be broadcast by the tracking device 46. Moreover, the work tool identification signal including the unique identifier (i.e., MAC address) may be configured to provide identification of the specific work tool 32, 42 that the tracking device 46 is attached to. Furthermore, the work tool asset tracking system 44 may be configured as a wireless communication network such as but not limited to, a Bluetooth® network, a near-field communication network, a radio frequency communication network, a computer data network, a Wi-Fi data network, a cellular data network, a satellite data network, or other such data communication network and the tracking device 46 may be configured as a wireless data communication device such as a Bluetooth® low energy device or other known wireless communication device.

In some embodiments, the work tool asset tracking system 44 may be configured such that each work tool 32, 42 located at the job site 43, or other such location, may be coupled to a tracking device 46. As a result, multiple work tool identification signals may be transmitted or broadcast around the job site 43. Moreover, each work tool identification signal may include the unique identifier (i.e., MAC address), which is associated with and identifies the specific work tool 32, 42 that the tracking device 46 is attached to. In some embodiments, the unique identifier (i.e., MAC address) included in the work tool identification signal may be permanently stored in a read-only memory (ROM) module 47 or other such firmware component of the tracking device 46. As a result, the work tool identification signal and unique identifier may be linked to the specific work tool 32, 42 it is attached to and the signal may be configured to provide information such as but not limited to, tool identification, or other such information. Furthermore, while the use of a MAC address as the unique identifier is discussed above, it will be understood that alternative methods are possible to assign and store the unique identifier in each tracking device 46.

The work tool asset tracking system 44 may further include a scanning device 48 that is configured to scan or otherwise search for the work tool identification signal that is transmitted or otherwise broadcast from the tracking device 46. In some embodiments, the scanning device 48 may be a mobile wireless device such as a smart phone, a cellular telephone, a tablet computer, a personal digital assistant, a smartwatch, or other such mobile device. Additionally, the scanning device 48 may be configured as a handheld or wearable computing device including operating system software that is programmed to manage and operate the scanning device 48. Furthermore, one or more software applications 50 may be installed on the scanning device 48 and configured to execute one or more specific functions such as but not limited to, a scanning mode of the scanning device 48. Moreover, the software application 50 may be programmed to operate or otherwise run in the background of the scanning device 48 without the need for user input or intervention. In some embodiments, the scanning device 48 may be able to operate one or more additional programs or applications simultaneously and therefore, execute one or more functions such as but not limited to, scanning, monitoring, logging, scheduling, or other such task. Additionally, activation of the software application 50 may configure the scanning device 48 to operate in a continuous mode which scans, monitors, and receives the work tool identification signal transmitted by the tracking device 46.

As discussed above, the scanning device 48 may be configured as a mobile wireless device such as but not limited to, a smart phone, a cellular telephone, a tablet computer, a personal digital assistant, a smartwatch, or other such mobile device. While FIG. 2 illustrates a single scanning device 48 included in the work tool asset tracking system 44 it will be understood that multiple scanning devices 48 may be used. For example, the job site 43 (FIG. 1) may have multiple personnel (i.e., machine operators, laborers, supervisors, mechanics) working and moving about the job site 43. In some embodiments, one or more personnel at the job site 43 may be carrying a wireless communication device configured as a scanning device 48. As a result, one or more scanning devices 48 may be present at the job site 43 and configured to simultaneously to scan for the work tool identification signals being transmitted or otherwise broadcast around the job site 43.

In one non-limiting example, the scanning device 48 may be programmed to continuously scan or otherwise search for work tool identification signal which is transmitted or broadcast by the tracking device 46. As discussed above, the tracking device 46 may be configured as a Bluetooth® low energy device which broadcasts the work tool identification signal as a Bluetooth® low energy signal. Furthermore, there may be multiple tracking devices 46 located around the job site 43. Each tracking device 46 may transmit a work tool identification signal that contains a different unique identifier (i.e., MAC address), and each unique identifier may associate and link one tracking device 46 with the specific work tool 32, 42 it is attached to. Therefore, the scanning device 48 may be configured to detect or otherwise identify multiple work tool identification signals any time the scanning device 48 comes within the transmission or broadcast range of one or more tracking devices 46. In one non-limiting example, the tracking device 46 and scanning device 48 may be configured to operate with a transmission and detection range of up to 100 feet. As a result, the scanning device 48 will detect the transmitted work tool identification signal whenever the scanning device 48 is a distance of 100 feet or less from the tracking device 46. However, it will be understood that other ranges (i.e., larger or smaller) are possible depending on the desired power consumption, accuracy, and other such parameters of the tracking system.

Additionally or alternatively, the scanning device 48 may be programmed to non-continuously scan or otherwise search for the work tool identification signal which is transmitted or broadcast by the tracking device 46. In some embodiments, the scanning device 48 may be selectably configured such that an operator may select or otherwise operate the scanning device in the continuous mode or the non-continuous mode. In one non-limiting example, the non-continuous mode may configure the scanning device 48 to scan for a pre-determined amount of time (i.e., five minutes) and then pause the scan for the work tool identification signal for a pre-determined amount of time (i.e., five minutes). The five minute time interval is provided as one non-limiting example of operating the scanning device 48 in the non-continuous mode. The non-continuous mode may use a longer or shorter interval depending on conditions such as, battery life of the scanning device 48.

Furthermore, the scanning device 48 may include a location identification module 52 and a communication module 54. In some embodiments, the location identification module 52 may be a global positioning system (GPS) receiver that is configured to receive GPS positioning data to provide location coordinates and other positioning data of the scanning device 48. Moreover, the location identification module 52 may create a work tool location signal based on the scanning device 48 location when the work tool identification signal is detected or otherwise received. As discussed above, the tracking device 46 and the scanning device 48 may be configured to operate within the job site 43. In one non-limiting example the tracking device 46 and the scanning device may have a transmission and detection range of up to 100 feet. However, it will be understood that other detection ranges (i.e., smaller or greater) are possible. Additionally, the work tool location signal may include a time stamp indicating the time the work tool identification signal was detected or received by the scanning device 48. As a result, the work tool location signal may be configured to include both the location and the time that the work tool identification signal from a specific work tool 32, 42 was detected.

Moreover, the scanning device 48 may include a communication module 54 which is communicably coupled to a work tool tracking controller 56 located in an asset location control center 58 or other operations back office location. The asset location control center 58 may be located somewhere on the job site 43 (FIG. 1) or alternatively, it may be located at a remote location away from the job site 43. As a result, the communications module 54 may be configured to transmit the work tool location signal over a variety of distances (i.e., short or long) using a radio frequency communication network, a computer data network, a Wi-Fi data network, a cellular data network, a satellite data network, or other such data communication network. Moreover, the communication module 54 may be configured to add a current date stamp to the work tool location signal and transmit the work tool location signal, including the date stamp, to the work tool tracking controller 56. Additionally, prior to transmitting the work tool location signal to the work tool tracking controller 56, the communication module 54 may be configured to confirm and update the time stamp previously added by the location identification module 52. Therefore, the work tool location signal transmitted to the work tool tracking controller 56 may include the identification, the location, the time, and the date the work tool identification signal from a specific work tool 32, 42 was detected. Additional information may be added to the transmitted work tool location signal as needed.

The work tool tracking controller 56 located in the asset location control center 58 may include a microprocessor 60 for executing software, programs, and/or algorithms that are configured to analyze, organize, control, monitor, and track the data associated with the tracking devices 46 and work tools 32, 42 present at the job site 43. Moreover, the microprocessor 60 may include a memory module 62 which further includes read-only memory (ROM) 64, configured to provide storage for the software, programs, algorithms, work tool location data and other such information. Additionally, the memory module 62 may include random access memory (RAM) 66, which provides storage space for data generated during execution of the software, programs, and/or algorithms. For example, the work tool tracking controller 56 may be configured to receive the work tool location signal transmitted by the scanning device 48 over a radio frequency communication network, a computer data network, a Wi-Fi data network, a cellular data network, a satellite data network, or other such data communication network. Once the work tool location signal is received, the work tool tracking controller 56 may save the work tool location signal into an asset location database 68 stored within the memory module 62 of the work tool tracking controller 56. Furthermore, the asset location database 68 may be organized to update and display the location and other information related to the work tools 32, 42. In one non-limiting example, the asset location database 68 may be organized to display a last known location of the work tool 32, 42 based on the work tool identification signal, the work tool location signal, the date, the time and other information associated with each work tool 32, 42.

Figure 3:
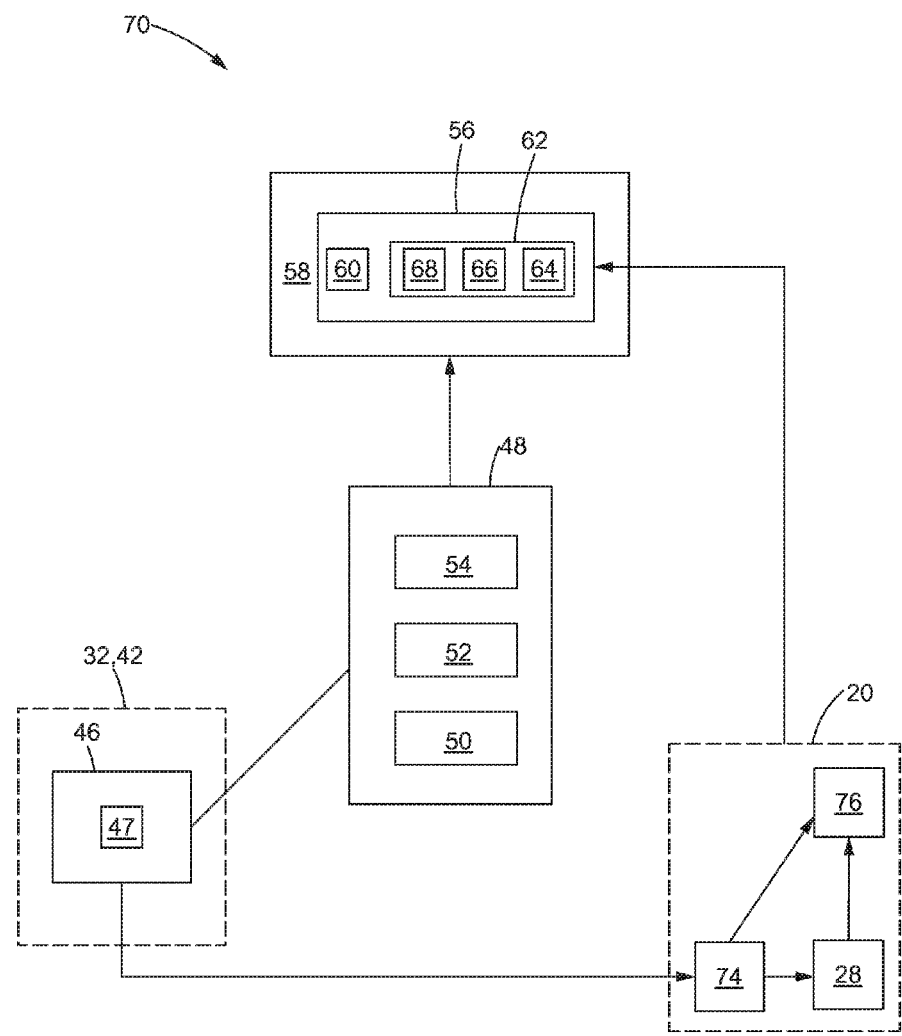
FIG. 3 is schematic diagram of a tracking system for tracking and monitoring the work tools and the work machine of FIG. 1, in accordance with an embodiment of the disclosure.

FIG. 3 with continued reference to FIGS. 1-2, provides a schematic of an alternative embodiment of a work tool asset tracking system 70 which is integrated with the work machine 20. Similar to the work tool asset tracking system 44, the work tool asset tracking system 70 may include the tracking device 46 attached to or otherwise mounted onto each work tool 32, 42 and the scanning device 48. Moreover, the tracking device 46 may be configured to transmit or otherwise broadcast the work tool identification signal including the unique identifier such as but not limited to, a media access control (MAC) address or other such unique identifier. The work tool identification signal including the unique identifier (i.e., MAC address) may be associated with and identify the specific work tool 32, 42 that the tracking device 46 is attached to. In some embodiments, the tracking device 46 may be configured as a wireless data communication device such as a Bluetooth® low energy device or other known wireless communication device, and the work tool asset tracking system 70 may be configured as a wireless communication network such as but not limited to, a Bluetooth® network, a near-field communication network, a radio frequency communication network, a computer data network, a Wi-Fi data network, a cellular data network, a satellite data network, or other such data communication network.

The work tool asset tracking system 70 may be configured such that each work tool 32, 42 that is located at the job site 43 or other such location may be coupled or otherwise attached to a tracking device 46. As a result, there may be multiple work tool identification signals that are being transmitted or broadcast over the job site 43. Moreover, each work tool identification signal may include the unique identifier, such as the MAC address, which is associated with the specific work tool 32, 42 that the tracking device 46 is attached to. In some embodiments, the unique identifier contained in the work tool identification signal (i.e., MAC address) may be permanently stored in a tracking device read-only memory (ROM) module 47 or other such firmware component of the tracking device. However, it will be understood that alternative methods are possible to assign and store the unique identifier in each tracking device 46.

Additionally, the work tool asset tracking system 70 may include an accelerometer 72 or other motion detecting sensor attached to each of the work tools 32, 42 located around the job site 43. In some embodiments, the accelerometer 72 may be configured to detect or capture a movement of the work tool 32, 42. For example, when the work tool 32, 42, is picked up or otherwise moved by the work machine 20, the accelerometer 72 may activate in response to the movement. In one non-limiting embodiment illustrated in FIG. 3, the accelerometer 72 may be integrated with the tracking device 46 and configured to utilize the wireless communication capabilities of the tracking device 46. Therefore, when the accelerometer 72 is energized or otherwise activated due to movement of the work tool 32, 42, the tracking device 46 may be activated and configured to transmit the unique identifier (i.e., MAC address) associated with the work tool identification signal. Moreover, the accelerometer 72 may cause the tracking device 46 to transmit or otherwise advertise a different packet of information which may identify which type of work tool 32, 42, or other such asset, the tracking device 46 is attached to. Additionally, incorporating the accelerometer 72 with the tracking device 46 may allow for increased functionality of the tracking device 46. For example, when the work tool 32, 42 is stationary the accelerometer 72 may be in a deactivated state and the tracking device 46 may transmit the work tool identification signal which includes the tool identification. However, if the work tool 32, 42 is moved or attached to the work machine 20 then the accelerometer 72 may become activated. Once activated, the accelerometer 72 may provide an input or other such signal such that the tracking device 46 includes additional information to the work tool identification signal. In one non-limiting example, tool availability (i.e., in use or not in use), tool type, tool parameters, and other such information may be added to the work tool identification signal. While one embodiment of the work tool asset tracking system 70 shown in FIG. 3 has the accelerometer integrated with the tracking device 46, it will be understood that the accelerometer 72 may be separate from the tracking device 46 and independently mounted on each work tool 32, 42 such that the accelerometer 72 is separately communicably coupled with the scanning device 48 or other mobile wireless communication device.

The work tool asset tracking system 70 may also incorporate the scanning device 48 which is configured to scan or otherwise search for the work tool identification signal and the unique identifier (i.e., MAC address) transmitted or otherwise broadcast by the tracking device 46 and accelerometer 72. As discussed above, the scanning device 48 may be a mobile wireless device such as a smart phone device, a cellular telephone device, a tablet computer, a personal digital assistant, a smartwatch device, or other such mobile device. The scanning device 48 may be configured as a handheld or wearable computing device carried or attached to an operator of the work machine 20, and may include operating system software programmed to run and operate the scanning device 48. Furthermore, one or more software applications 50 may be installed on the scanning device 48 which are configured to operate a specific function of the scanning device 48 such as but not limited to, a scanning mode. Moreover, the software application 50 may be programmed to operate in the background of the scanning device 48 without the need for user input or intervention. In some embodiments, the scanning device 48 may be able to operate one or more additional programs or applications simultaneously. As a result, once the software application 50 is activated it may be configured to operate in a continuous mode and perform tasks such as but not limited to, scanning, monitoring, logging, scheduling, or other such task. Additionally, the software application 50 may configure the scanning device to receive the work tool identification signal transmitted by the tracking device 46.

Additionally, the work tool asset tracking system 70 may include a machine wireless data communication device 74 such as a Bluetooth® low energy transceiver or other known wireless communication device, installed on the work machine 20. Similar to the scanning device 48 discussed above, the machine wireless data communication device 74 may be configured to scan or otherwise search for the work tool identification signal transmitted or otherwise broadcast from the tracking device 46 and the accelerometer 72. Furthermore, the machine wireless data communication device 74 may be communicably coupled to the machine control module 28 located within the operator compartment 26 (FIG. 1), or other such location of the work machine 20. In some embodiments, the machine wireless data communication device 74 may receive or otherwise detect the work tool identification signal and then transmit the work tool identification signal to the machine control module 28. Furthermore, the machine control module 28 may analyze the work tool identification signal and identify the specific work tool 32, 42.

Furthermore, if a specific work tool 32, 42 is picked up or otherwise attached to the work machine 20, the tracking device 46 and the accelerometer 72 may transmit additional information to the machine wireless data communication device 74. For example, movement of the work tool 32, 42 may activate the accelerometer 72 which instructs the tracking device 46 to transmit the specific tool type, along with the work tool identification signal. In some embodiments, the machine control module 28 may be programmed to include pre-defined operational parameters (i.e., hydraulic pressure, power, coolant flow) for a specific work tool 32, 42. Therefore, the machine control module 28 may automatically load a set of pre-defined operational parameters once the specific type of work tool 32, 42 attached to the work machine 20 is identified. Furthermore, the machine control module 28 may provide instructions or other such operational commands for a user to select and/or follow based on the specific type of work tool 32, 42. For example, the machine control module 28 may be communicably coupled to a display device (not shown) or other such output device. As a result, the machine control module 28 may communicate or otherwise output a set of operational instructions or other such commands to an operator of the work machine 20, and the operator may be instructed to select one or more operational modes configured to operate or otherwise control the specific work tool 32, 42 attached to the work machine 20. Such a configuration may provide advantages and improvements such as but not limited to, improved work machine 20 efficiency, reduced wear on the work tools 32, 42, prolonged work tool life 32,42, decrease work machine 20 downtime, and other such operational advantages. Additionally, during use of the work tool 32, 42, the accelerometer 72 may provide information that can be used for adjusting tool parameters, tracking tool use, detecting tool malfunctions and other such functions.

Moreover, the work tool asset tracking system 70 may include a telematics control module 76 configured with a global positioning system (GPS) receiver that receives GPS positioning data. In some embodiments, the telematics control module 76 may be installed on the work machine 20 and configured to provide tracking and navigation functions to the work machine 20 operator. Moreover, the machine wireless data communication device 74 may be communicably coupled to the machine control module 28 and the telematics control module 76 through a wired connection. As such, the machine wireless data communication device 74, the machine control module 28, and the telematics control module 76 may be adjacently positioned to one another in the operator compartment 26 or other location of the work machine 20. Alternatively, the machine wireless data communication device 74 may be communicably coupled to the machine control module 28 and the telematics control module 76 through a wireless communication network such as, a Bluetooth® network, a near-field communication network, a radio frequency communication network, a computer data network, a Wi-Fi data network, a cellular data network, a satellite data network, or other such data communication network. In one non-limiting example, the machine wireless data communication device 74 transmits the work tool identification signal to the telematics control module 76. Alternatively or additionally, the machine wireless data communication device 74 may transmit the work tool identification signal to the machine control module 28, which in turn then transmits the work tool identification signal to the telematics control module 76. Similar to the location identification module 52 discussed above, the telematics control module 76 may generate the work tool location signal based on the work tool identification signal detected or otherwise received by the telematics control module 76.

In some embodiments, the telematics control module 76 may receive the work tool identification signal directly from the machine wireless data communication device 74. As a result, the telematics control module 76 may combine the work tool identification signal with the GPS data to generate the work tool location signal for the specific work tool 32, 42. Additionally or alternatively, the telematics control module 76 may receive the work tool identification signal from the machine control module 28. Furthermore, the machine control module 28 may provide the identification of the work machine 20 such that the telematics control module 76 may combine the GPS data with the work tool identification signal and the work machine 20 information to generate the work tool location signal for the specific work tool 32, 42 attached to the specific work machine 20.

Furthermore, the telematics control module 76 may be communicably coupled to the work tool tracking controller 56 located in the asset location control center 58 or other operations back office location. In some embodiments, the telematics control module 76 is configured to transmit the work tool location signal over a radio frequency communication network, a computer data network, a Wi-Fi data network, a cellular data network, a satellite data network, or other such data communication network. Moreover, the telematics control module 76 may be configured to add a current date and time stamp and transmit the work tool location signal to the work tool tracking controller 56.

The work tool tracking controller 56 located in the asset location control center 58 may include the microprocessor 60 for executing the software, programs, and/or algorithms that are configured to control, monitor, and track the locations of the work tools 32, 42 around the job site 43. Moreover, the microprocessor 60 may include a memory module 62 which further includes read only memory (ROM) 64, configured to provide storage for the software, programs, algorithms, asset location data and other such information. Additionally, the memory module 62 may include random access memory (RAM) 66, which provides storage space for data generated during execution of the software, programs, and/or algorithms. For example, the work tool tracking controller 56 may be configured to receive the work tool location signal transmitted by the telematics control module 76 over a radio frequency communication network, a computer data network, a Wi-Fi data network, a cellular data network, a satellite data network, or other such data communication network. Once the work tool location signal is received, the work tool tracking controller 56 may save the work tool location signal into an asset location database 68 stored within the memory module 62 of the work tool tracking controller 56. Furthermore, the asset location database 68 may be organized to update and display the location and other information related to the work tools 32, 42. In one non-limiting example, the asset location database 68 may be organized to display the last known location of the work tool 32, 42 based on the work tool identification signal, the work tool location signal, the date, the time and other information associated with each work tool 32, 42. Additionally, the asset location database 68 may be further organized to display the last known location of the work tool 32, 42 and which work machine 20 the work tool 32, 42 is currently attached to based on the work tool identification signal, the work tool location signal, the date, the time, the work machine 20 information, and other information associated with each work tool 32, 42.

INDUSTRIAL APPLICABILITY

In general, the present disclosure may find application in many industries, including but not limited to, construction, mining, agriculture, and other such industries. In one non-limiting embodiment, a work tool asset tracking system 44 may include a tracking device 46 and a scanning device 48. The tracking device 46 may be attached to a work tool 32, 42 located at a job site 43. The tracking device 46 may be configured to transmit a work tool identification signal that is capable of being detected by the scanning device 48. Moreover, the work tool identification signal may include a unique identifier (i.e., MAC address) that is associated with and identifies the specific work tool 32, 42 that the tracking device 46 is attached to. Furthermore, the scanning device 48 may be configured to include a location with the work tool identification signal to generate a work tool location signal. The scanning device 48 may be further configured to transmit the work tool location signal to the work tool tracking controller 56 located in the asset location control center 58.

In an additional embodiment, a work tool asset tracking system 70 may utilize the tracking device 46 coupled to a work tool 32, 42, along with a machine wireless data communication device 74 installed on the work machine 20. The machine wireless data communication device 74 may be configured to work with the scanning device 48 to scan and detect the work identification signal transmitted by the tracking device 46. Additionally, the machine wireless data communication device 74 may be communicably coupled with a machine control module 28, a telematics control module 76, and other components and systems of the work machine 20. As a result, the work machine 20 may receive work tool 32, 42 information transmitted by the tracking device 46 and the telematics control module 76 may transmit work tool 32, 42 information and work machine 20 information to the work tool tracking controller 56 located in the asset location control center 58.

The work tool asset tracking systems 44, 70 may allow for tracking and identification of work tools 32, 42 located around the job site 43. Such information may be valuable to the operator of a work machine 20 because it may notify the operator where a specific work tool 32, 42 may be located. Moreover, the work tool asset tracking systems 44, 70 may allow supervisors or other managers to more efficiently plan and organize work tasks based on increased knowledge of where specific work tools 32, 42 are located, and where a specific work tool 32, 42 may be currently in use. Additionally, the work tool asset tracking systems 44, 70 may help increase productivity, reduce tool wear, and monitor tool performance by transmitting specific work tool 32, 42 information to the work machine 20 such that a set of pre-configured operational parameters may be automatically loaded and executed by the machine control module 28.

Figure 4:
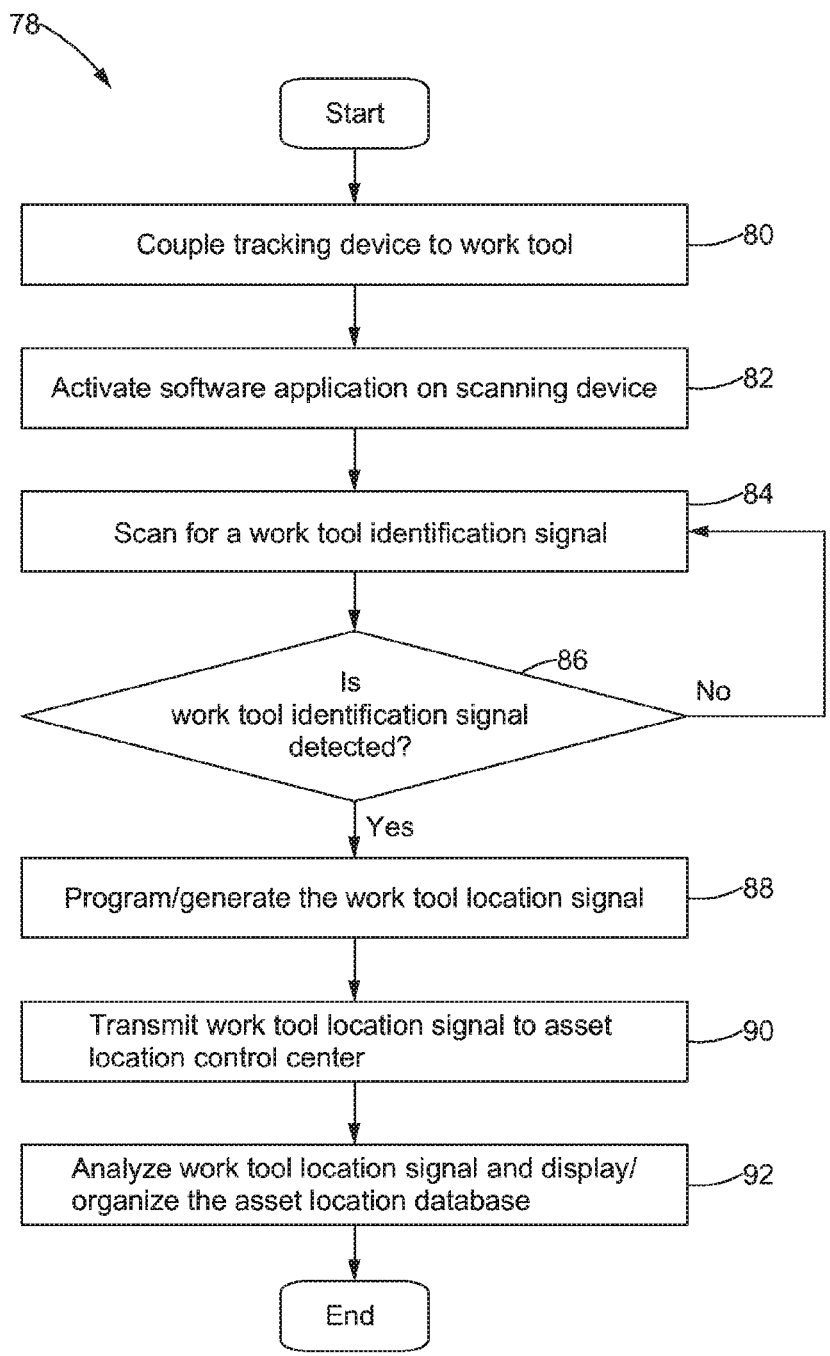
FIG. 4 is a flow chart of a method executed by the control system of FIGS. 2 and 3 for tracking the work tools of FIG. 1, in accordance with an embodiment of the present disclosure.

Referring to FIG. 4, with continued reference to FIGS. 1-3, a method 78 for tracking a location of a work tool 32, 42 is shown. In a first block 80 of the method 78, the tracking device 46 is coupled the work tool 32, 42 which is to be tracked. In some embodiments, the job site 43 or other location where the work tool 32, 42 is located may include multiple work tools 32, 42 that are to be tracked. As a result, each of the work tools 32, 42 may be coupled with a tracking device 46 such that the work tool 32, 42 may be individually tracked. Furthermore, the tracking device 46 may be configured as a low power wireless communication device, such as a Bluetooth® low energy device. In some embodiments, the tracking device 46 may be configured to transmit or broadcast a work tool identification signal which may be detected or otherwise received by the scanning device 48.

To begin tracking the work tools 32, 42 that are configured with the tracking device 45, in a next block 82, the software application 50 may be activated on the scanning device 48. The scanning device 48 may be a mobile wireless device such as a smart phone device, a cellular phone device, a tablet computer, a personal digital assistant, a smart watch device, or any other such wireless device. Moreover, the scanning device 48 may be configured as a mobile computing device that includes at least one software application 50 installed on the device. In some embodiments, the activation of the software application 50 may activate a scanning mode such that the scanning device 48 begins searching for the work tool identification signal or other such communication being transmitted by the tracking device 46. Furthermore, the software application 50 may be programmed to operate in the background of the scanning device 48 without the need for additional user input or intervention. Therefore, once the software application 50 is activated it may be configured to continuously scan or otherwise search for the work tool identification signal.

In a next block 84, the work tool asset tracking system 44 begins scanning and tracking the work tools 32, 42 located at the job site 43. In some embodiments, the scanning device 48 is controlled by the software application 50 configured to scan or search for the work tool identification signal. Moreover, in some embodiments, the work tool identification signal is configured as a Bluetooth® low energy signal and the scanning device 48 may scan, monitor and log the detection of such signals. Additionally, since the scanning device 48 may be configured as a mobile wireless device, and the user or operator of the scanning device 48 may carry or wear the device as they move about the job site 43. As a result, the scanning device 48 may be configured to be in a continuous scanning mode and scan or otherwise search for the work tool identification signal. Typically, the scanning device 48 may be configured with a detection range up to 100 feet from the tracking device 46. Therefore, when the scanning device 48 is activated, it will be able to detect the work tool identification signal transmitted by the tracking device 46 that is a distance of 100 feet or less from the scanning device 48.

In a next block 86, the scanning device 48 may make a determination of whether the work tool identification signal is detected or not. If the work tool identification signal is not detected then the scanning device 48 may continue scanning for the work tool identification signal. However, if the scanning device determines that the work tool signal has been detected, then in a next block 88 the scanning device may process the detected work tool identification signal and add location information, time information, date information and other useful information related to tracking of the work tools 32, 42. In some embodiments, the scanning device 48 may include a location identification module 52 (i.e., GPS receiver) that receives the GPS positioning data of the scanning device and includes the GPS positioning data with the work tool identification signal to generate the work tool location signal. Furthermore, the location identification module 52 may include a time stamp with the work tool location signal to indicate the time the scanning device 48 detected the work tool identification signal transmitted by the tracking device 46.

The scanning device 48 may further include a communication module 54 which may communicably couple the scanning device to the work tool tracking controller 56 located in the asset location control center 58 or other operations back office location. Thus, in a next block 90 the communication module 54 may be configured to transmit the work tool location signal over a radio frequency communication network, a computer data network, a Wi-Fi data network, a cellular data network, a satellite data network, or other such data communication network. Furthermore, the work tool tracking controller 56 may save the asset location signal and other data transmitted by the scanning device into the asset location database 68. In a next block 92, the work tool tracking controller 56 may analyze and organize the asset location signal data saved in the asset location database 68. In one non-limiting example, the asset location database 68 may be organized to display the last known location of the work tool 32, 42 based on the work tool identification signal, the work tool location signal, the date, time and other information associated with the tracking device 46 coupled to each work tool 32, 42.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. A tracking system for a work tool, the tracking system comprising:
   a tracking device coupled to the work tool and configured to transmit a work tool identification signal;
   a wireless communication device configured to scan for and detect the work tool identification signal within a work area;
   a location identification module coupled to the wireless communication device and configured to receive the work tool identification signal, and generate a work tool location signal, including a location indicator and a unique work tool identifier;
   a communication module coupled to the wireless communication device and configured to add a date and time stamp to the work tool location signal and transmit the work tool location signal to an asset location control center;
   at least one accelerometer coupled to the tracking device, the accelerometer activating the tracking device when the work tool is picked up by a work machine such that the tracking device communicates with a machine control module located on the work machine; and
   a controller located in the asset location control center configured to receive the work tool location signal with the date and time stamp, the controller programmed to save the work tool location signal with the date and time stamp into an asset location database such that the asset location database displays a last known location of the work tool.

2. The tracking system of claim 1, wherein the work tool identification signal is configured as a low power wireless signal,
   wherein the wireless communication device is configured to detect the low power wireless signal, and
   wherein the low power wireless signal includes Bluetooth® low energy signal.

3. The tracking system of claim 2, wherein the wireless mobile device is configured to detect the low power wireless signal of the tracking device, and the low power wireless signal includes the unique work tool identifier and other work tool data such that the controller located in the asset location control center associates the tracking device with a specific work tool.

4. The tracking system of claim 1, wherein the wireless communication device is selectably configured to scan for the work tool identification signal in a plurality of scanning modes including a continuous mode and a discontinuous mode, wherein the wireless communication device is selected to operate in one of the plurality of scanning modes and configured to automatically transmit a detected work tool identification signal to the controller located in the asset location control center.

5. The tracking system of claim 1, wherein the machine control module receives the work tool identification signal and a work tool specification signal such that the machine control module identifies the work tool picked up, executes a set of pre-defined control settings configured to operate the work tool, and communicates a set of operational instructions to an operator of the work machine based on the work tool identification signal.

6. The tracking system of claim 5, wherein the at least one accelerometer operably coupled to the tracking device is further configured to provide information regarding tool use of the work tool, and
wherein the machine control module receives the information regarding tool use, generates a work tool log, and transmits the work tool log to the controller located in the asset location control center.

7. A method of tracking a location of a work tool, the method comprising:
coupling a tracking device to the work tool and configuring the tracking device to transmit a work tool identification signal,
at least one accelerometer being coupled to the tracking device,
the accelerometer activating the tracking device when the work tool is picked up by a work machine such that the tracking device communicates with a machine control module located on the work machine;
scanning for the work tool identification signal using a scanning device configured to detect the work tool identification signal within a work area;
programming a work tool location signal based on a location of the scanning device when the work tool identification signal is received,
including a date and time stamp with the work tool location signal;
transmitting the work tool location signal to a controller located in an asset location control center; and
receiving the work tool location signal, saving the work tool location signal with the date and time stamp to an asset location database, and displaying a last known location of the work tool in the asset location database.

8. The method of claim 7, wherein the work tool identification signal is configured as a low power wireless signal,
the low power wireless signal including Bluetooth® low energy signal, and
wherein scanning for the low power wireless signal includes configuring the scanning device as a wireless mobile device to detect the low power wireless signal.

9. The method of claim 8, wherein the scanning device is configured to detect the low power wireless signal of the tracking device, and the low power wireless signal includes a unique work tool identifier and other work tool data such that the controller located in the asset location control center associates the tracking device with a specific work tool.

10. The method of claim 7, wherein scanning for the work tool identification signal includes selectably configuring the scanning device to scan for the work tool identification signal in a plurality of scanning modes including a continuous mode and a discontinuous mode, wherein the scanning device is selected to operate in one of the plurality of scanning modes and configured to automatically transmit a detected work tool identification signal to the controller located in the asset location control center.

11. The method of claim 7, wherein transmitting the work tool identification signal includes sending a work tool specification signal to a machine control module located on the work machine.

12. The method of claim 11, wherein the machine control module receives both the work tool identification signal and the work tool specification signal such that the machine control module identifies the work tool picked up by the work machine, executes a set of pre-defined control settings configured to operate the work tool, and communicates a set of operational instructions to an operator of the work machine based on the work tool identification signal.

13. The method of claim 12, wherein the at least one accelerometer operably coupled to the tracking device is further configured to track and provide information regarding tool use of the work tool, and
wherein the machine control module receives the information regarding tool use, generates a work tool log, and transmits the work tool log to the controller located in the asset location control center.

14. A work machine including a tracking system for a work tool, the work machine comprising:
a frame configured to support a power source of the work machine and the work tool operably coupled to the frame;
a tracking device coupled to the work tool and configured to transmit a work tool identification signal;
a wireless communication device connected to the work machine and configured to scan for the work tool identification signal within a work area;
a machine control module communicably coupled to the wireless communication device and configured to receive the work tool identification signal, the machine control module including:
a location identification module communicably coupled to the machine control module to generate a work tool location signal based on a detection location of the work tool identification signal;
a communication module communicably coupled to the machine control module to add a date and time stamp to the work tool location signal and transmit the work tool location signal to a controller located in an asset location control center; and
at least one accelerometer coupled to the tracking device,
the accelerometer activating the tracking device when the work tool is picked up by the work machine and the tracking device communicating with the machine control module.

15. The work machine of claim 14, wherein the work tool identification signal is configured as a low power wireless signal,
the low power wireless signal including Bluetooth® low energy signal, and
wherein the wireless communication device attached to the work machine is configured to detect and receive the low power wireless signal.

16. The work machine of claim 15, wherein the low power wireless signal of the tracking device includes a unique work tool identifier and other work tool data such that the controller located in the asset location control center associates the tracking device with a specific work tool.

17. The work machine of claim 14, wherein the accelerometer causes the tracking device to transmit, to the machine control module, information regarding a tool type of the work tool after the work tool is picked up, and wherein the machine control module is configured to identify operational parameters for the work tool based on the information regarding the tool type.

18. The work machine of claim 17, wherein the machine control module receives the work tool identification signal and a work tool specification signal such that the machine control module identifies the work tool picked up by the work machine, executes a set of pre-defined control settings configured to operate the work tool, and communicates a set of operational instructions to an operator of the work machine based on the work tool identification signal.

19. The work machine of claim 18, wherein the at least one accelerometer operably coupled to the tracking device is further configured to track and provide information regarding tool use of the work tool, and the machine control module receives the information regarding tool use, generates a work tool log, and the machine control module transmits the work tool log to the controller located in the asset location control center.

* * * * *